Nov. 12, 1963 W. C. PEACOCK 3,110,893
VISUAL DISPLAY DEVICE
Filed Sept. 9, 1959 6 Sheets-Sheet 1

FIG. 1A

INVENTOR.
WENDELL C. PEACOCK
BY
*Joseph Weingarten*
ATTORNEY

Nov. 12, 1963 W. C. PEACOCK 3,110,893
VISUAL DISPLAY DEVICE
Filed Sept. 9, 1959 6 Sheets-Sheet 4

FIG. 4

INVENTOR.
WENDELL C. PEACOCK
BY
Joseph Weingarten
ATTORNEY

INVENTOR.
WENDELL C. PEACOCK
BY
ATTORNEY

FIG. 6

United States Patent Office
3,110,893
Patented Nov. 12, 1963

3,110,893
VISUAL DISPLAY DEVICE
Wendell C. Peacock, Dover, Mass., assignor, by mesne assignments, to Laboratory For Electronics, Inc., Boston, Mass., a corporation of Delaware
Filed Sept. 9, 1959, Ser. No. 838,987
12 Claims. (Cl. 340—336)

The present invention relates in general to the visual display of symbolic information and more particularly to apparatus for translating data received in the form of coded impulses into a visible display characteristic thereof.

Devices for the display of coded information in the form of representative visible symbols are quite well known in the electrical and mechanical arts. For example, one of the older techniques for converting electrically coded information into a visual digital display comprises an array of small neon lamps disposed behind a mask having an equal number of translucent digits. Electrical decoding apparatus is used to accept the available data and provide a characteristic output signal for illuminating the respective neon lamps, and thus transmit light through the selected digits. This arrangement which has found wide acceptance as a display for the output of high speed electronic counters is particularly advantageous because of low initial cost; however, it is seriously limited from an aesthetic point of view in that the respective digits are illuminated in widely separated positions. With these limitations in view, means have recently been made commercially available for visually presenting any one of a relatively large number of symbols within a predetermined rectangular area. One such arrangement utilizes a rectangular matrix of either small neon lamps or incandescent lamps. By illuminating a preselected configuration of lamps within this matrix, it is possible to present any one of a large number of symbols, the upper limit being the number of possible combinations of lamps within the matrix. It is at once evident, however, that if the desired resolution calls for an 8 x 10 matrix of lamps, a total of 80 lamps and the wiring therefor must be made available, thus posing a problem of excessive first cost and statistically high maintenance problems.

Recently a novel display tube has been introduced in which an in-line array of filamentary electrodes, each shaped in accordance with a desired symbol, is enclosed in a neon atmosphere. By selectively energizing one of the available electrodes, the respective symbol is made visible from the front of the tube. Because of the complexity of the electrode structure, the initial cost is relatively high and a failure at any point in the tube destroys the effectiveness of the device. In addition to these drawbacks, such a tube, when sealed, is thereafter limited to display of the symbols associated with the filamentary wires, thus making the device completely inflexible for numerous applications. While each of the prior art devices mentioned above has presented its own characteristic drawbacks, there has existed one well known common disadvantage, namely the requirement for relatively complex electronic systems capable of decoding electrical symbol data in the form in which it is most commonly available. Thus, it is well known that most of the electronic and mechanical systems requiring symbol display as the ultimate output receive and operate with information in coded form, as for example the conventional binary system of notation. For example, output symbol displays are almost universally used for presenting the cumulated counts of an electronic scaler. In electrical form the symbol to be displayed in characterized by a plurality of binary voltage signals, often by virtue of the respective states of a plurality of cascaded flip-flop circuits. Typically, four such flip-flop circuits provide four voltages at either of two levels characteristic of one of the ten decimal digits. If, then, ten neon lamps are used in the display system generally noted above, it is essential to translate these binary voltage levels into a signal which selectively illuminates the respective digit signal lamp, and for this purpose relatively complex and costly resistive matrices are required. In fact, this problem becomes even more costly and complex when translating from the low voltage levels provided in the outputs of transistor circuits to the relatively high potentials required to ignite the neon lamps. Evidently, this problem is even more complicated when it is desired to translate four binary voltage signals to those required to illuminate a prescribed array of lamps in the rectangular matrix, and it is not uncommon for such systems to require far more electrical apparatus in the decoding circuits than that required for the scaling circuits themselves.

With these limitations in view, the present invention contemplates and has as a primary object the provision of a novel and highly economical visual display system in which any one of an exceedingly large plurality of arbitrary symbols may be presented at relatively high speed and efficiency, with equal size if desired, in a display area whose size and definition are entirely one of design choice.

It is another object of this invention to provide visual symbol display appartus in which the display technique itself is inherently capable of decoding electrical or mechanical data representations without the requirement for intermediate electrical or mechanical translation apparatus.

It is a further object of this invention to provide a relatively, simple, easily produced, compact apparatus capable of independently displaying any one of an extraordinarily large number of arbitrary symbols within a prescribed area while utilizing, if desired, substantially the entire area for each of the desired symbols.

It is still a further object of this invention to provide visual display means operative directly from binary coded electrical or mechanical coded data.

It is another object of this invention to provide a compact visual display means which may readily be arranged in tandem with like means to present any desired multi-symbol or multi-digit character representation.

Broadly speaking, the symbol generator apparatus of the present invention includes a plurality of spaced members each capable of assuming one or more distinctive positions. In any one positional arrangement, these members may define a predetermined arbitrary symbol whose definition is dependent upon design parameters which to a large extent are a matter of choice. More specifically, the symbol display apparatus of the present invention may comprise a plurality of superimposed parallel plates, each of which is either fixed or constrained to move within established limits. By suitably designing each of these plates in a manner to be described herein, each positional combination of these plates may, by prearrangement of a particular characteristic thereof, define any one of a number of symbols such that the total number of distinctive symbols which may be presented equals the number of available combinations. Typically, this invention may be utilized to present a visual representation of the decimal digits 0–9. For this specific purpose, the apparatus in accordance with the principles of this invention may utilize 5 generally rectangular superposed parallel plates, each of which is formed with a relatively large number of light transmissive paths. Of the five plates, one may be fixed, while the other four are each provided with means permitting one of the two distinctive positions. By appropriately positioning these light transmissive paths, each positional combination of the four movable plates will present a distinctive symbol, and of the total number of combinations available, the digits 0–9 may be formed.

As will be described, there are a relatively large number of ways in which the concept of the present invention may be embodied into a symbol presentation device. In one such embodiment, the parallel plate arrangement may be placed at the front end of a suitable housing and a single continuously energized conventional light source may be positioned behind the plate and within the housing so that the combinations of light transmissive paths constituting a particular symbol appear on the face of the device as sharply defined luminous points. No beam switching or contacts need be provided for the light source other than that required to remove the illumination during periods of non-use.

In the specific embodiment of the device mentioned immediately above, the four movable plates may each be slideably arranged for actuation by respective simple solenoids. These solenoids which then define the two characteristic positions of each of the movable plates may in turn be energized from a convenient source of coded electrical information, and the relationship between the action of the four plate and solenoid combinations and the binary system of electrically encoding data should at once become apparent. Stated otherwise, it is possible to energize the four solenoids from some source of four bit binary coded decimal electrical signals (such as the output of four cascaded flip-flops) to attain directly decoded information in the form of a visual display characteristic of the particular information code.

Other objects and advantages of the present invention will now become apparent from the following detailed description when taken in conjunction with the accompanying drawings in which.

Figure 1:
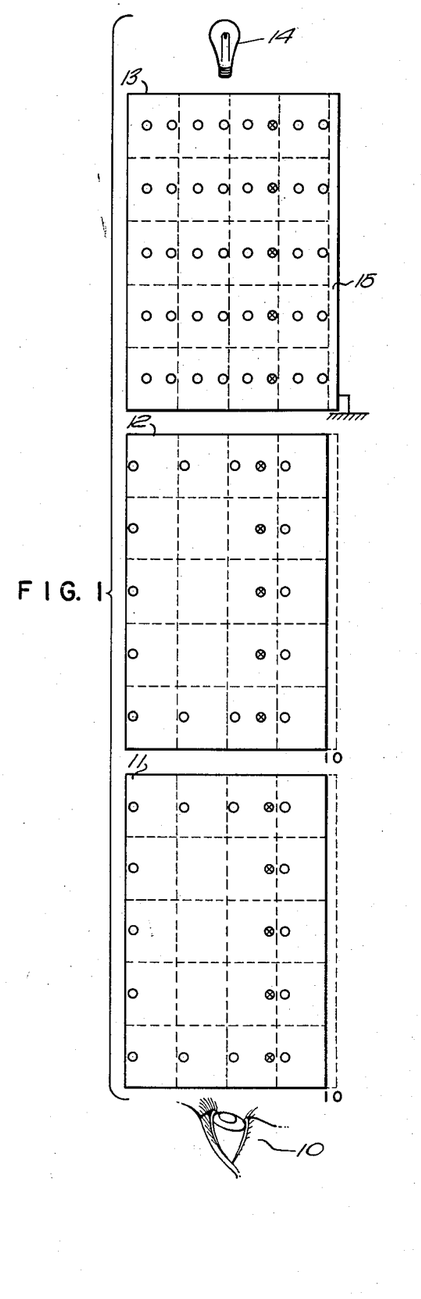
FIG. 1 is a diagrammatic, perspective view illustrating a simplified embodiment of the present invention.

With reference now to FIG. 1 there is illustrated a simplified apparatus for the presentation of the symbols 0 and 1, which serves to illustrate the basic principle of this invention. The apparatus consists of three parallel and generally superimposed plates 11, 12, and 13 between a light source 14 and the eye of the viewer, indicated at 10. Plate 13 is fixed in position, while plates 11 and 12 may be independently moved into either of two laterally displaced positions, designated as the 0 and 1 positions. Each plate, as illustrated by the dotted lines, is divided into a 5 x 4 matrix and each matrix square will hereafter be referred to as a "block." It is seen that when the movable plates 11 and 12 occupy the 1 position, the blocks in these plates are in exact superposition with the corresponding block in fixed plate 13, whereas when movable plates 11 and 12 occupy the 0 position, they have been displaced laterally a distance of approximately one-fourth of the block width and hence the movable plate blocks are now no longer aligned with the respective stationary plate blocks by this distance. The light transmissive areas in the plates are indicated by small circular openings, the diameter of which is selected to be less than ¼ of the block width. In the fixed plate 13, two light transmissive circles are provided in each block. These two circles are located in each block of the fixed plate in the same relative vertical position as transmissive openings in the movable plates 11 and 12. Further in each block of the fixed plate 13, the two openings are horizontally displaced on centers an amount equal to twice the lateral displacement between the 0 and 1 positions of each movable plate. This provides that a light path in a movable plate which is, in one position, aligned with a light path in the fixed plate, can never be aligned with any light path in the fixed plate when that movable plate occupies the other position.

In the arrangement illustrated in FIG. 1, the circles in the fixed plate 13 are arranged so that in each block one is adjacent to the right-hand boundry thereof, while the second circle is horizontally spaced to the left by the distance specified above. A margin 15 no less than one circle diameter in width is located on the right-hand side of fixed plate 13 and contains no light transmissive paths.

Figure 1A:
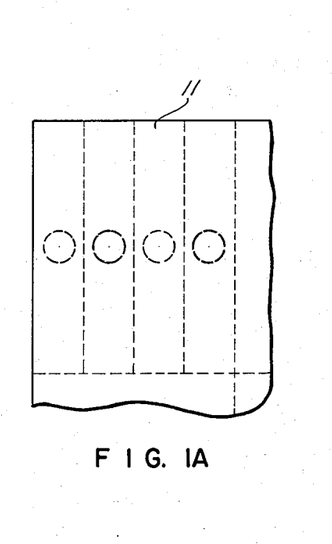
FIG. 1A is a view of the upper left-hand corner of one of the plates shown in FIG. 1.

In movable plates 11 and 12 the light paths may be located in any of four potential positions across the width of each block, as shown by the dotted circle in FIG. 1A. This provides that each movable plate may have a light path aligned with either of the light paths in each block in the fixed plate 13 in either the 0 or 1 positions of the respective movable plate.

Having described the arrangement of the light paths within the blocks the locations of these paths to form a particular symbol can now be discussed. Since there are two movable plates, 11 and 12, each having two positions (the 0 and the 1 position) there are four possible combinations of these plate positions and hence four individual symbols can be generated. In this example, only two symbols will be shown corresponding to the positions 1, 0 and 0, 0 for the plates 11 and 12, respectively. The positions then for which no symbol is shown are 0, 1 and 1, 1. Considering now the position 1, 0; it is seen that the light paths in which an X has been inscribed are aligned in all three plates, and that only these light paths are aligned. Hence, a vertical straight line symbol, 1, will be displayed. In the 0, 0 position, the X'd circles in plate 11 no longer align with any circles in fixed plate 13, but rather the circles in plates 11 and 12 in which no X has been transcribed are aligned with one another, and with light paths in fixed plate 13, to form the symbol 0. It can also be seen that in the 0, 1 position no light paths are aligned with light paths in fixed plate 13 and this is also the case in the position 1, 1. Thus in the 0, 1 and 1, 1 positions, no light is seen by the eye 10 of the observer.

In the above example two movable plates having two positions each were employed; hence, there were four possible combinations of plate positions. While only two such combinations were used to generate symbols, it will be understood that four symbols could have been generated, one for each of the unique combinations of plate positions.

In order to display the ten Arabic numerals, ten discrete combinations of plate position are necessary, which, in the case of plates capable of occupying either of two positions, requires four movable plates. If each plate is arranged to have a matrix of 5 x 4 blocks, then in this example, the presence or absence of illumination in any of these twenty locations may be used to form the desired symbol. In order to have maximum flexibility in symbol display, each block should be capable of being illuminated for each symbol to be displayed and the symbol can then be formed by selecting the blocks which will not be illuminated. The most straightforward manner of providing that a block may or may not be illuminated for any symbol, is an arrangement whereby, within any block, the same number of light transmissive paths may be provided as the number of symbols to be displayed. Thus, if the ten Arabic numerals are to be displayed, each block should be capable of providing ten discrete light paths and yet for any given symbol (corresponding to a unique combination of plate positions) only one of the light paths in each block should be capable of being illuminated. An area which is capable of becoming a light path will hereinafter be referred to as a virtual light path, whereas an area which has, in fact, been made light transmissive will be referred to as an actual light path.

Figure 2:
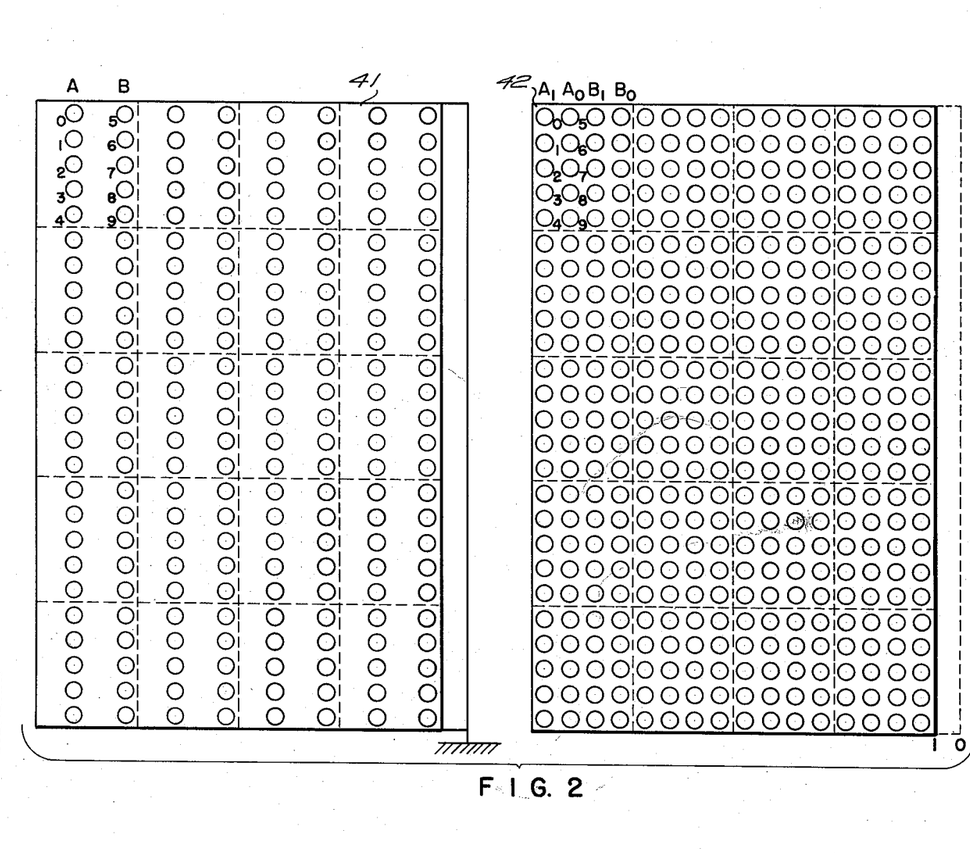
FIG. 2 is a front view of two of the symbol translation plates useful in apparatus embodying the concept of this invention.

Turning now to a consideration the arrangement of virtual light paths in the plate of an apparatus as above described, containing one fixed and four movable plates, FIG. 2 illustrates a layout for both the fixed and one of the movable plates. The remainder of the movable plates would be laid out in the same manner as the one shown. The fixed plate 41 is laid out in a 5 x 4 matrix and further has a margin on the right-hand edge approximately one-fourth of a block width. Each block is seen to have two columns of virtual light paths; the paths in the left-hand column thereof being numbered 0 through 4, while the paths in the right-hand column are numbered 5 through 9. In each block, the left-hand column is located in the second potential position from the left-hand boundary, pursuant to FIG. 1A, and the right-hand column is located in the fourth potential position from the same boundary. In the fixed plate, all of the virtual light paths are made into actual light transmissive paths so that, dependent entirely upon the location and relative position of actual light paths in the movable plates for any given combination, any one of the light paths in each block on the fixed plate may be illuminated.

Movable plate 42 is divided into the same matrix of blocks as the fixed plate. However, in this plate it is seen that each block contains twenty virtual light paths, the paths being approximately adjacent to one another in both the vertical and horizontal directions. With reference to movable plate 42, the notation $A_1$, $A_0$, $B_1$, $B_0$ is used to represent the four columns of virtual light paths from left to right in the block. The two columns of actual light paths in the fixed plate 41 are labeled A and B, from left to right, and correspond with the $A_0$ and $B_0$ columns in the movable plate when the plates are in superimposed position, which in turn corresponds to movable plate 42 being in the 0 position. It is further seen that when movable plate 42 is moved to the 1 position, the $A_1$ and $B_1$ columns are now aligned with the A and B columns in the fixed plate. This arrangement provides that a virtual light path in the movable plate can be aligned with any transmissive path position in the fixed plate, no matter which position the movable plate is in. A light spot can now be generated at any path position in the fixed plate by making transmissive paths in the movable plates, at the same vertical level and in the corresponding blocks. These paths in the movable plates are located in the $A_0$ or $B_0$ column of plates which will be in the 0 position and in the $A_1$ or $B_1$ column of plates in the 1 position. By applying these principles, a light spot can be generated in each block on the fixed plate for any combination of plate positions.

Figure 4:
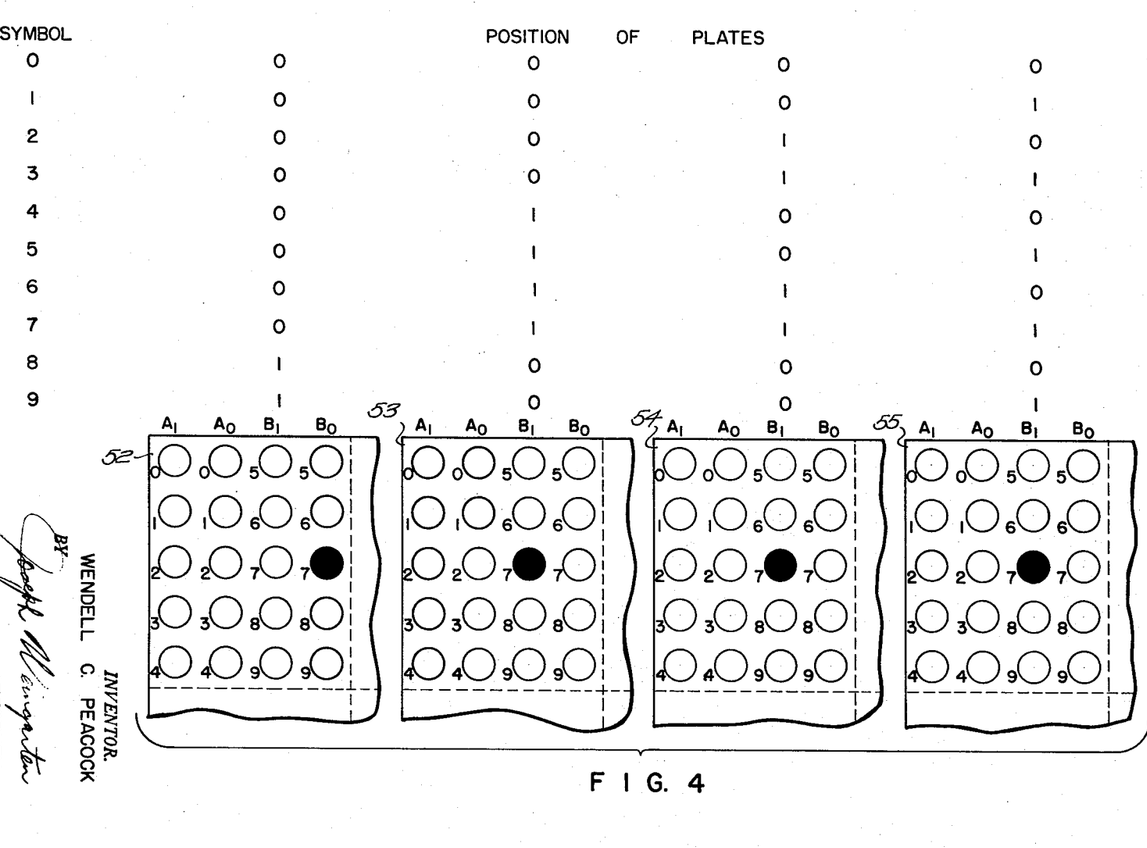
FIG. 4 is a diagrammatic representation of a corner of each of four plates which may be used in this invention for the purpose of specifically illustrating the technique by which each of these plates is prepared for use.

An apparatus having one fixed and four movable plates laid out in the manner described above, is suitable for displaying the ten Arabic numerals. The input information of this apparatus must consist of four information channels, each channel being capable of presenting either of two conditions, such as a positive potential and a zero potential. Each movable plate is then arranged so that for one potential it occupies the 0 position, while for the other potential it occupies the 1 position. A binary notation of the Arabic numerals presents such an input. The binary notation for the ten Arabic numerals in conjunction with a portion of four movable plates is shown in FIG. 4. The appropriate symbol can be displayed by making virtual paths in the movable plates actually transmissive in those blocks which form the representative symbol, the decision as to whether the transmissive path is to be located in the (1) or in the (0) column being dictated by the position which each plate will occupy for any given numeral.

Figure 3:
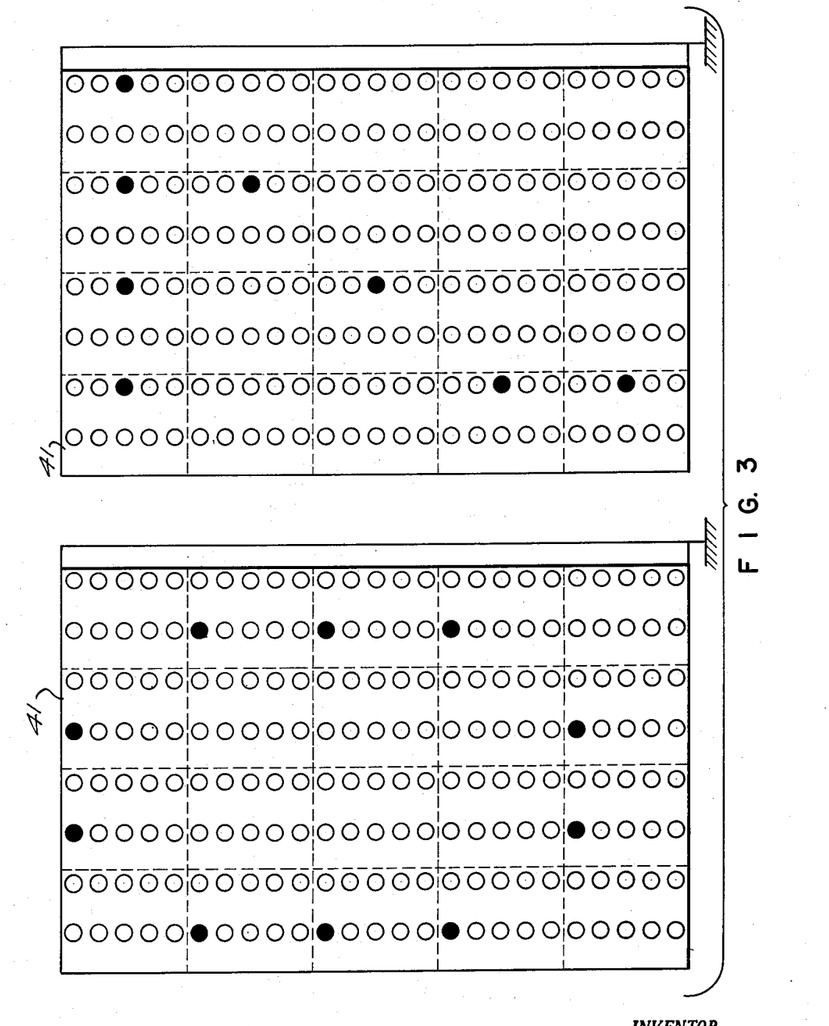
FIG. 3 is a diagrammatic illustration of two matrices useful in the preparation of the various movable plates of this invention.

This method is illustrated in FIGS. 3 and 4. Turning to FIG. 3, there is shown the fixed plate 41 on which, in one view, there has been laid out the pattern for a zero, and in the other, the figure seven. The particular selection blocks from which to construct the symbol is a matter of design choice; however, the zero and seven have been selected as typical. The lower portion of FIG. 4 is a diagrammatic illustration showing the upper left block of each of the four movable plates, 52, 53, 54, and 55, and includes a tabulation of their positions for the numerals 0 through 9. Considering now FIG. 4 in conjunction with FIG. 3, it is seen that for the numeral zero there is no light spot in the upper left block and consequently, there is no transmissive path indicated in this block in FIG. 4. But the numeral seven does have a light spot located in the seven position in the upper left block and in FIG. 4 this is illustrated by the solid dot. Thus, it is seen that in the first plate 52, which has the position 0 in the binary notation of numeral seven, the display point marked 7 is made transmissive in the column B, whereas in the plates 53, 54, and 55, all of which are in the position 1 in binary notation for numeral seven, the 7 cell in the $B_1$ column is made transmissive. This will accomplish the desired result of lighting the 7 spot in the fixed plate in that the $B_0$ column in the plate which is in the 0 position and the B column in the fixed plate (see FIG. 2) are in line with the $B_1$ columns in the plates in the 1 position. While the above has illustrated the principle for only one block and two numerals, it can readily be seen that using the tables shown in FIG. 4 and selecting appropriate symbols as in FIG. 3 for the other numerals, the location of transmissive points can systematically be made.

Figures 5, 5A:
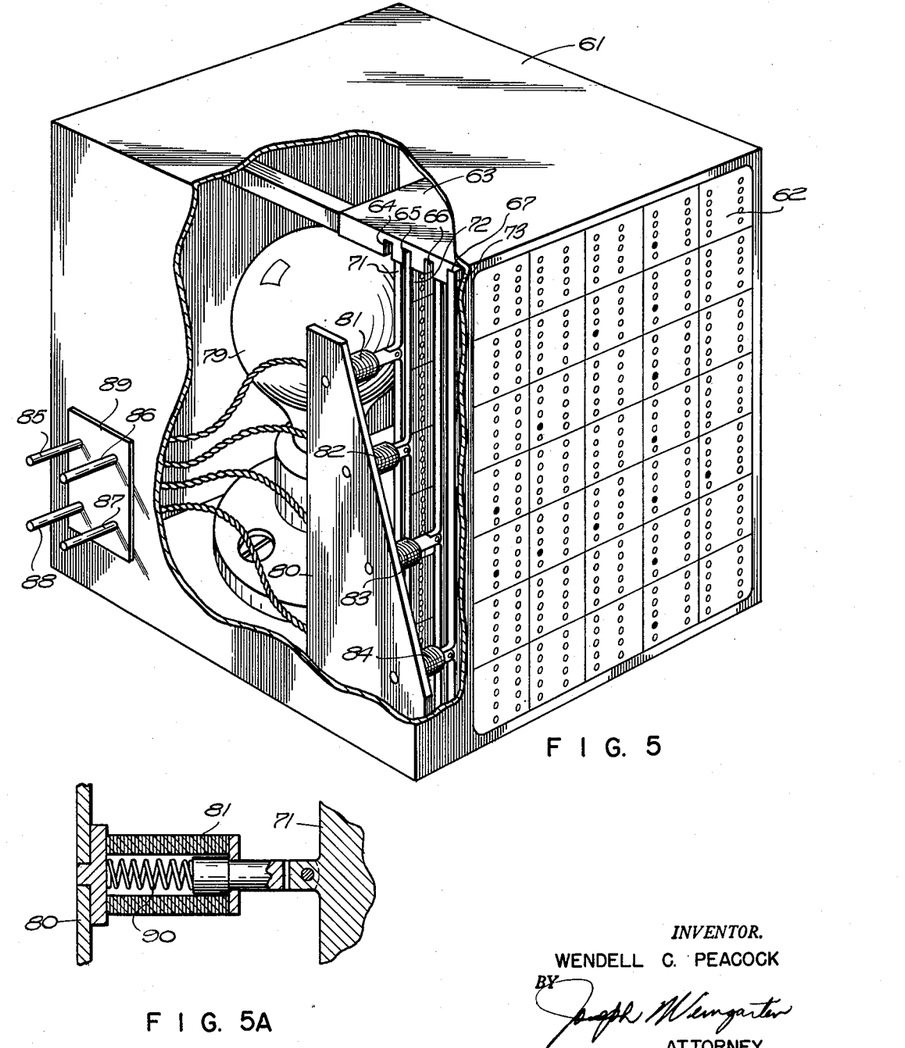
FIG. 5 is a perspective view of a symbol display device embodying the principles of this invention, the housing of which has been partially cut away to illustrate significant portions of the internal structure thereof.
FIG. 5A is a view of one actuating component of the device of FIG. 5.

FIG. 5 is an illustration of an apparatus embodying the above principles, which has been formed with one fixed and four movable plates for the display of the numerals 0 through 9. A portion of the housing has been broken open to illustrate internal detail. A fixed plate 52 is seen to be laid out in a matrix of 5 x 7 blocks at the front end of housing 61. Movable plates 71, 72, 73, and 74 are slidably mounted in slots 64, 65, 66, and 67, respectively, of a top retaining member 63. The bottom retaining member, similarily constructed (not shown), retains the lower edges of these plates. These movable plates in the 0 position are located in alignment with the matrix on the fixed plate, while in the 1 position they are moved a distance to the left approximately equal to the center to center separation of adjacent circles, pursuant to FIG. 1A. The configuration as illustrated is that for the numeral 4, which corresponds to a binary notation of 0 1 0 0 (See FIG. 4 table) and plate 72 is therefore located in the left-hand or 1 position, whereas plate 71, 73, and 74 are in the 0 or right-hand position. In this apparatus, a light source 79 located behind the series of plates illuminates the display through fixed plate 62. The movement of the plates is controlled by solenoids 81, 82, 83, and 84, mounted on bracket 80, which is attached to the wall of housing 61. Solenoids 81, 82, 83, and 84 are electrically connected to terminal pins 85, 86, 87, and 88, respectively, of connector 89, the second terminal on these solenoids being connected to a common ground. A spring 90 shown in the solenoid detail, FIG. 5A, retains each of the plates in the right-hand or 0 position when no current flows through the solenoid.

The size of this apparatus is a matter of design choice, depending primarily upon the application in which the display means is to be used. The plates may be formed in many different ways from a variety of materials. For example, the plates may be formed from photographic film which has been developed in such a pattern that it is generally opaque; but in those positions where it is desired to be transmissive, the film has been rendered translucent. This method permits ready duplication and also provides a convenient movable plate. Another method which has been used is to form the plates from perforated metal plates overlaid with a layer of metal foil, in which the foil is punched out in those positions where it is desired to make a transmissive point.

Figure 6:
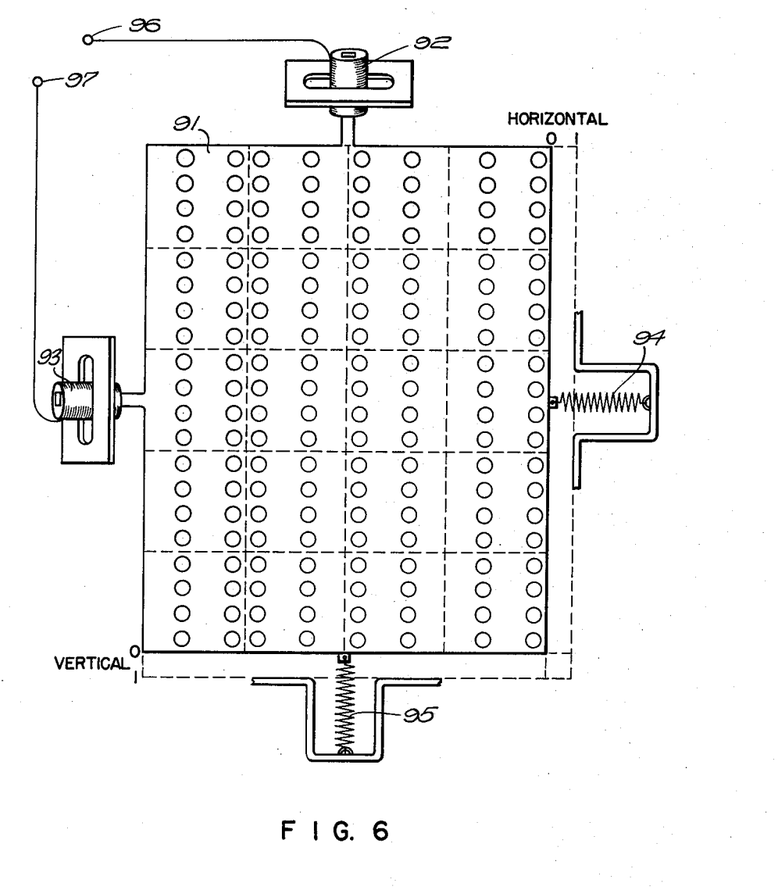
FIG. 6 is a diagrammatic illustration of an alternative embodiment of a plate for association with the symbol display apparatus disclosed herein.

When the above embodiment has been described in terms of two position translational motion and employs movable plates and a fixed plate, the invention is not so limited. Turning now to FIG. 6, there is shown a movable plate 91, having two degrees of freedom and four positions as indicated by the dotted lines, these positions being vertical, 0 and 1, and horizontal, 0 and 1. If it is desired to retain a binary coded input, two solenoids, 92 and 93, and two springs 94 and 95 may be used to control the vertical and horizontal motions, respectively, from binary inputs 96 and 97. In this case, N movable plates would have $N^4$ combinations of position and hence two movable plates would be sufficient to provide sixteen separate symbols. This principle may be extended to utilization of a tertiary or even more complex code, such that each of several degrees of freedom may have several positions, thereby providing a large number of symbol capabilities with relatively few plates. It should also be recognized that not only horizontal and vertical movement may be used, but also rotational motion is included within the scope of this invention.

For purposes of clarity, the method of locating the display points in the plates has previously been described in terms of the rectangular coordinates; however, virtually any geometric pattern may be used, providing only that there is a capability of displaying a symbol having generally the same size as the display screen and being representative of the coded information.

Again, while the above apparatus was described in terms of movable and fixed plates, it is clear that it is not necessary to have a fixed plate, but rather that alignment of transmissive points in the movable plates is sufficient. Nor is it necessary that each block have separate display points for each plate combination, since many symbols will utilize a point in the same block.

Finally, while the apparatus described employed a projection of a light source through the aligned holes to form the display symbol, the invention encompasses any means of providing a display in conformity with the aligned paths through the plates. For example, if insulating plates are used, each transmissive path may be replaced by a button-type electrical contact, the plates being sufficiently close that for any combination of 0 and 1 positions, electrical transmission circuits are established to illuminate individual light bulbs arrayed in a matrix corresponding to the circles shown in the front plate 62 of FIG. 5.

From the foregoing, it is obvious that many modifications and improvements may now be made by those skilled in the art; the invention disclosed herein should be construed as limited only by the spirit and scope of the appended claims.

What is claimed is:

1. Apparatus for selectively displaying any one of a predetermined group of visual symbols comprising, a source of energy, a display face, a stationary planar element, a plurality of movable planar elements in cooperative association with said stationary element, independent means associated with each of said movable planar elements for positioning each element in a first predetermined lateral position in response to one type of applied stimulus and in a second predetermined lateral position in response to a defferent type of applied stimulus, said display face being composed of a plurality of image forming areas, said planar elements each having areas corresponding to each of said image forming areas on said display face, said stationary planar element being formed with aplurality of energy transmissive paths therethrough, the number of said transmissive paths in each area of said stationary element being at least equal to the total number of positional combinations of said planar elements, each of said movable planar elements being formed such that it may provide an energy transmissive path aligned with each energy transmissive path in said stationary element in either of said lateral positions, whereby by providing energy transmissive paths in said movable elements in alignment with selected transmissive paths in said stationary element for each positional combination of said elements, one of said group of visual symbols is displayed by said display face as a plurality of energy transmissive areas.

2. Apparatus for selectively displaying in outline facsimile any one of a predetermined group of visual symbols comprising, a source of energy, a display face, a plurality of mechanically bistable elements, independent means associated with each of said bistable elements for determining the state of said element in response to an applied stimulus, each of said elements being formed with a plurality of energy transmissive paths therethrough, said bistable elements being disposed in such space relationship that the number and position of energy transmissive paths permitting transmission of energy from said energy source to said display face for each different combination of states of said bistable elements forms a visual pattern on said display face corresponding to the outline facsimile of a respective one of said predetermined group of visual symbols.

3. Display apparatus in accordance with claim 2 wherein said source provides luminous energy, whereby said visual pattern is formed of a plurality of luminous points.

4. Display apparatus in accordance with claim 2 wherein said mechanically bistable elements are each a planar opaque member, said energy transmissive paths being formed as discrete openings therein.

5. Display apparatus in accordance with claim 1 wherein said means for positioning each of said movable elements comprises electromechanical means responsive to said applied stimuli.

6. Apparatus for selectively and visually displaying any one of a predetermined group of symbols comprising, a light source, a plurality of image forming substantially planar elements in parallel superposition, at least one of said image forming elements being stationary with the remainder thereof being independently movable into either one of two laterally displaced positions, each of said image forming elements being provided with a plurality of image forming areas, each said image forming area in said one stationary element being provided with a multiplicity of light transmissive openings, selected image forming areas in said movable elements being formed with light transmissive openings disposed in alignment with one of said openings in said stationary element in at least one of said two positions of the respective movable element, electromechanical means for selectively controlling the lateral position of each of said movable elements, means for applying an electrical signal characteristic of one of said symbols in said group to said electromechanical means whereby, for each of said applied signals the positional combination of said movable and stationary elements defines no more than one light transmissive path for each of said image areas through aligned openings in said elements, said light transmissive paths transmitting light from said source to provide a luminous image formed of a plurality of luminous points in the shape of one of said symbols in said group.

7. Display apparatus in accordance with claim 6 wherein said image forming areas in each of said elements are disposed in a substantially rectangular matrix.

8. Display apparatus in accordance with claim 7 wherein said applied electrical signals comprise a group of electrical impulses equal in number to said movable elements, said impulses being a binary representation of the selected symbol to be displayed.

9. Display apparatus in accordance with claim 8 wherein said electromechanical means for controlling the position of each of said movable elements comprises a two position solenoid coupled to each of said movable elements, said electrical impulses being selectively coupled to and controlling the operation of a respective solenoid.

10. Display apparatus in accordance with claim 7 wherein said light transmissive openings in each of said image forming areas are in turn disposed in a substantially rectangular matrix.

11. Apparatus for displaying a plurality of predetermined visual symbols such as alpha-numeric characters, by displaying a multiplicity of points defining an outline of the respective symbol, comprising, a source of radiant energy, a plurality of planar elements, each element being generally opaque to said radiant energy, said elements being arranged in substantially parallel superposition, each of said elements being capable independently of assuming one of a plurality of lateral positions in response to a stimulus applied to it, each of said elements being formed with energy transmissive paths therethrough in a direction normal to the plane of their movement, said energy transmissive paths being so arranged that for each unique positional combination of all of the said elements, a multiplicity of energy transmissive paths through all of said elements forms said outline of the respective symbol.

12. Apparatus for selectively displaying any one of a predetermined group of visual symbols in the form of a dotted fascimile outline selected from a rectilinear dot matrix comprising, a source of radiant energy, a display face, a stationary planar element, a plurality of movable planar elements in cooperative association with said stationary element, independent means associated with each of said movable planar elements for positioning each of said elements in a first predetermined lateral position in response to one type of applied stimulus, said stationary planar element being formed with a plurality of energy transmissive paths therethrough forming a rectilinear dot matrix on said display face, each of said movable planar elements being formed such that it may provide an energy transmissive path aligned with each energy transmissive path in said stationary element in either of said lateral positions, whereby by providing energy transmissive paths in said movable elements in alignment with selected transmissive paths in said stationary element for each positional combination of said element, a portion of said dot matrix is selectively illuminated forming a facsimile outline of one of said group of visual symbols.

References Cited in the file of this patent

UNITED STATES PATENTS

| | | |
|---|---|---|
| 1,938,899 | Gilman | Dec. 12, 1933 |
| 2,605,965 | Shepherd | Aug. 5, 1952 |
| 2,881,976 | Greanias | Apr. 14, 1959 |